No. 812,767. PATENTED FEB. 13, 1906.
B. H. McMILLAN, W. C. JOHNSON & F. M. COLLORD.
MACHINE FOR MOLDING CEMENT FENCE POSTS.
APPLICATION FILED MAR. 22, 1905.

8 SHEETS—SHEET 1.

WITNESSES:
INVENTORS:
Bennett H. McMillan
William C. Johnson
Frank M. Collord,
By
Attorneys No. 812,767. PATENTED FEB. 13, 1906.
B. H. McMILLAN, W. C. JOHNSON & F. M. COLLORD.
MACHINE FOR MOLDING CEMENT FENCE POSTS.
APPLICATION FILED MAR. 22, 1905.

8 SHEETS—SHEET 4.

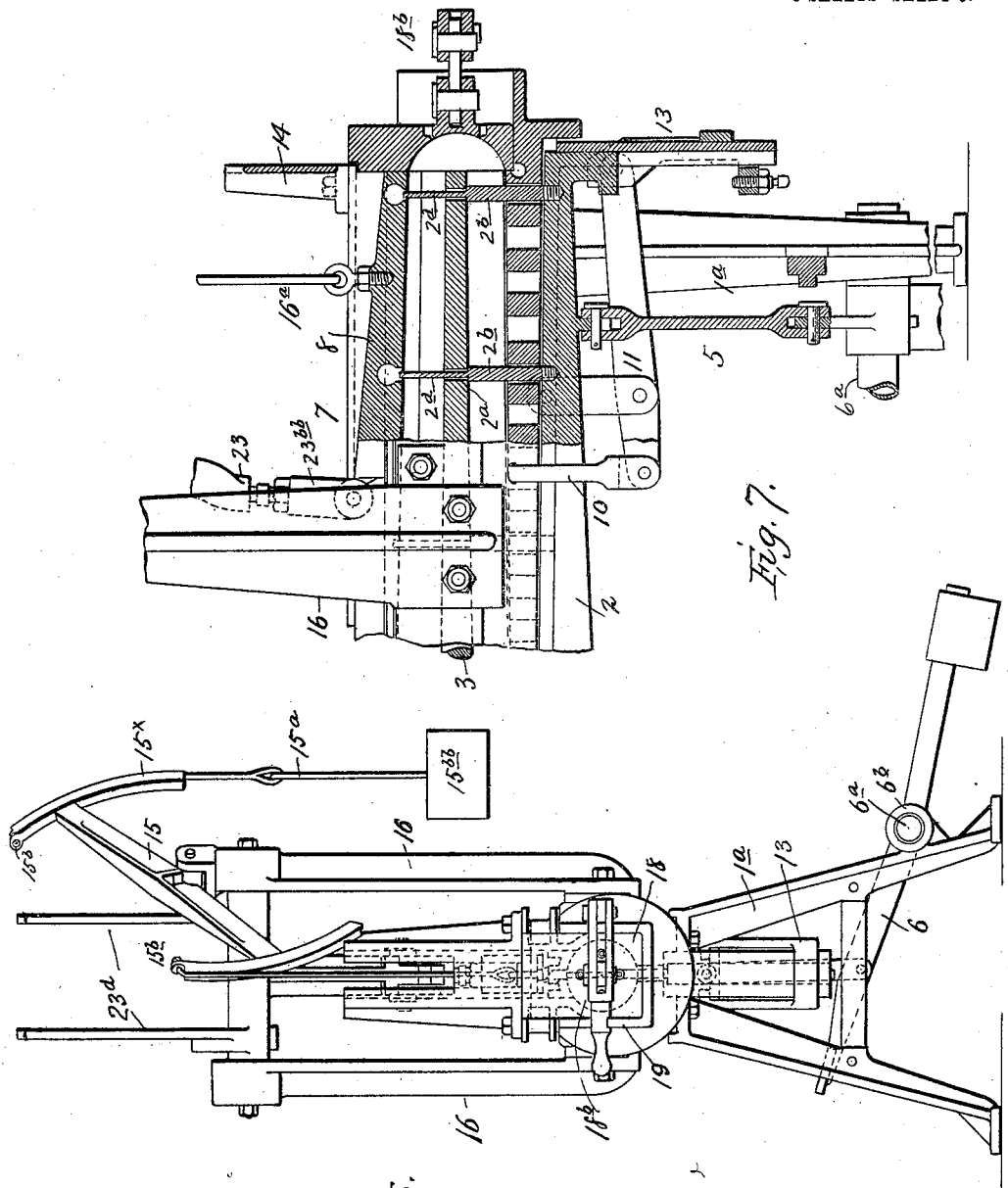

No. 812,767.
PATENTED FEB. 13, 1906.
B. H. McMILLAN, W. C. JOHNSON & F. M. COLLORD.
MACHINE FOR MOLDING CEMENT FENCE POSTS.
APPLICATION FILED MAR. 22, 1905.

8 SHEETS—SHEET 7.

WITNESSES:

Bennett H. McMillan
William C. Johnson
Frank M. Collord
INVENTORS,

BY
Attorneys.

UNITED STATES PATENT OFFICE.

BENNETT H. McMILLAN, WILLIAM C. JOHNSON, AND FRANK M. COLLORD, OF DANVILLE, ILLINOIS.

MACHINE FOR MOLDING CEMENT FENCE-POSTS.

No. 812,767.   Specification of Letters Patent.   Patented Feb. 13, 1906.

Application filed March 22, 1905. Serial No. 251,475.

*To all whom it may concern:*

Be it known that we, BENNETT H. MC-MILLAN, WILLIAM C. JOHNSON, and FRANK M. COLLORD, citizens of the United States, residing at Danville, in the county of Vermilion and State of Illinois, have invented new and useful Improvements in Machines for Molding Cement Fence-Posts, of which the following is a specification.

Our invention relates to improvements in fence-post-molding machines, more especially applicable for making such a post as forms the subject-matter of our Letters Patent granted December 27, 1904, No. 778,697, and produced principally from cement or like material, while it may be equally adapted for molding such posts generally.

Said invention has for its object to perform the molding operation in an effective manner; to provide for regulating the pressure required therefor; to effect said operation so as to produce the posts uniformly and with expedition or rapidity, thus lessening cost of manufacture, as well as being productive of certain other advantages, as is obvious.

The nature of said invention consists of sundry combinations of parts, also their structural features, substantially as hereinafter fully disclosed, and particularly pointed out by the claims.

Figure 1:
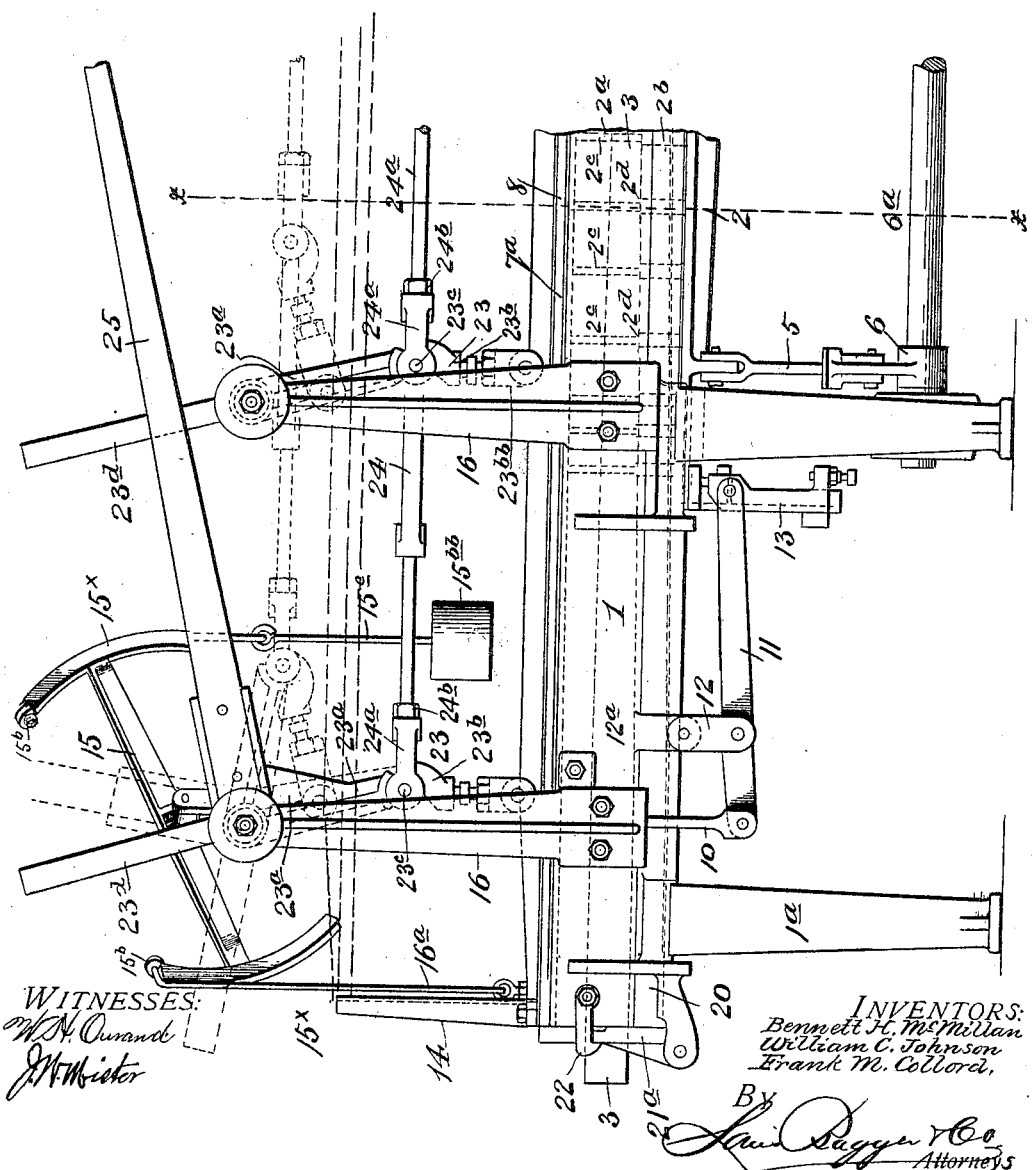
Figure 2:
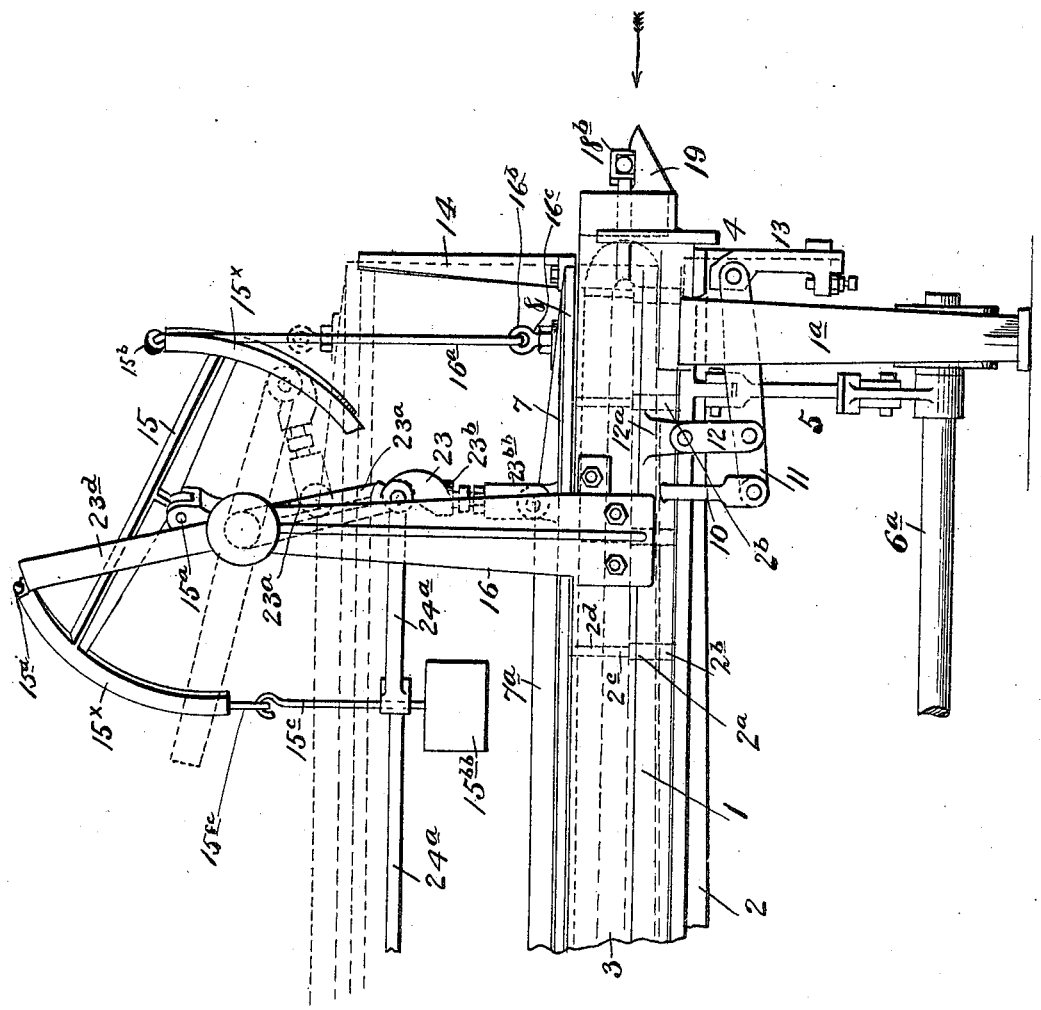
Figure 3:
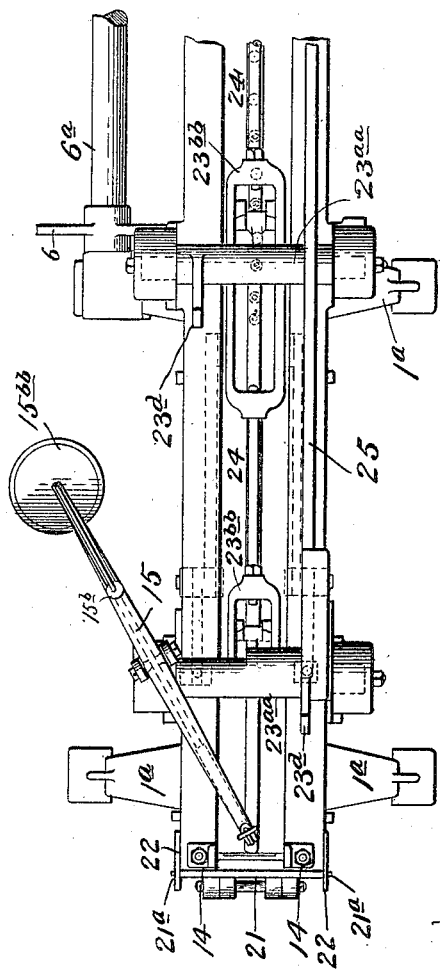
Figure 4:
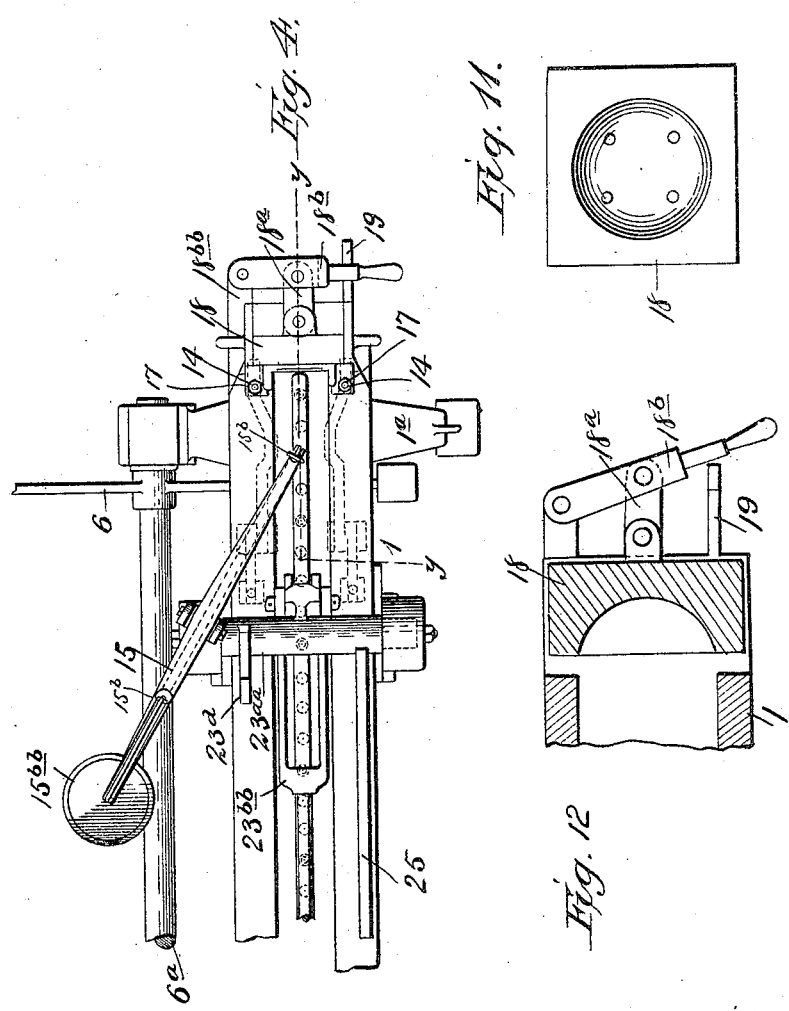
Figure 5:
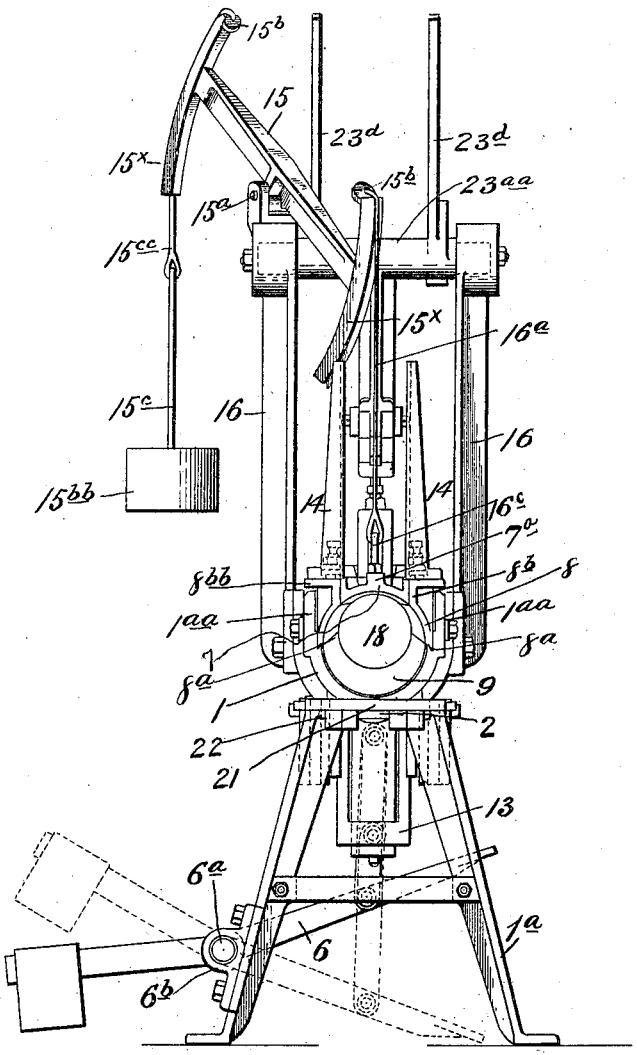
Figure 8:
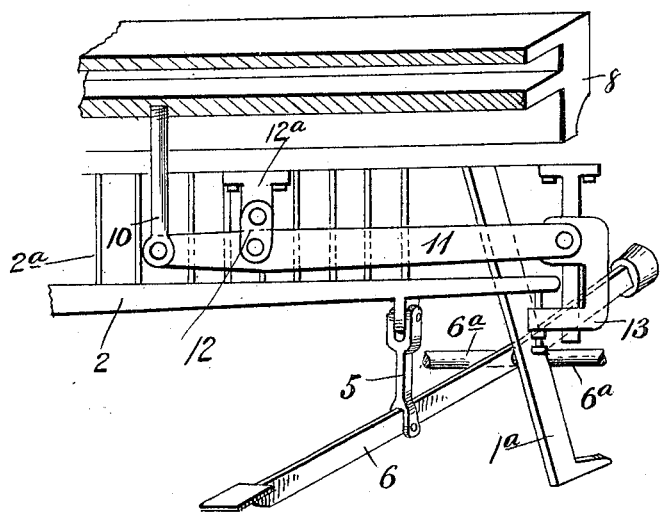
Figure 10:
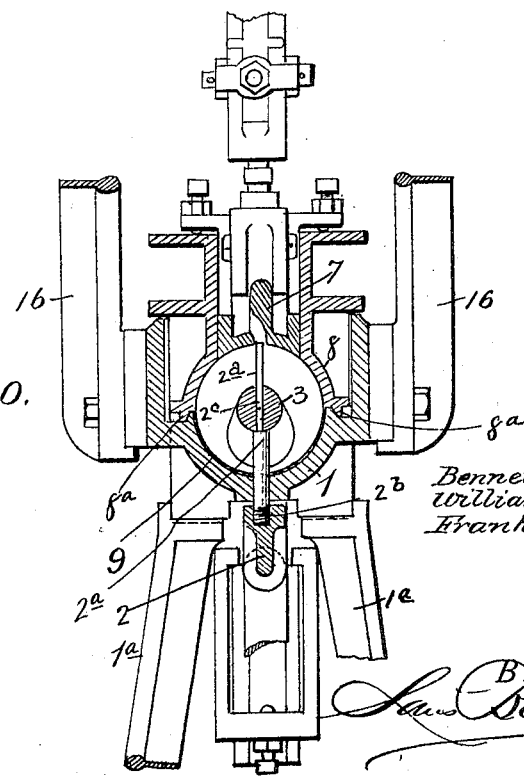
Figure 9:
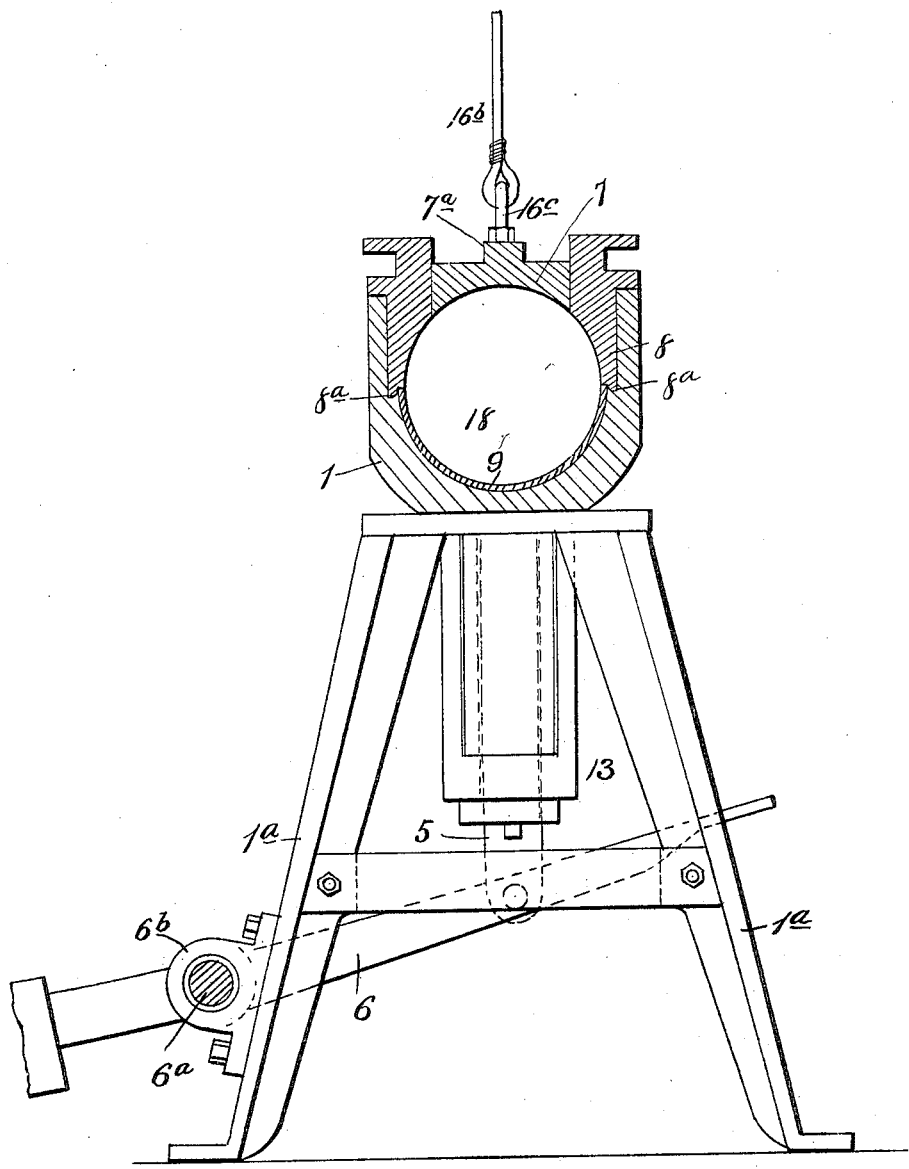

In the accompanying drawings, illustrating the preferred embodiment of our invention, Figures 1 and 2 are side views, supplemental one of the other, conjointly disclosing the machine in its entirety in side elevation. Figs. 3 and 4 are corresponding plan views illustrative of the machine in plan. Figs. 5 and 6 are opposite end views thereof. Figs. 7 and 8 are broken vertical longitudinal sections showing more especially certain structural characteristics of the respective end portions of the machine. Figs. 9 and 10 are transverse sections produced through the said end portions of the machine, respectively; and Figs. 11 and 12 are detail views of the headblock or mold-section.

In the disclosure of our invention we suitably mount or support upon preferably trestle-like framing or supports $1^a$ an approximately semicylindric member 1, forming the body portion of the mold, which is also somewhat tapering longitudinally to conform to that portion of the outline of the prospective post it is designed to produce. Arranged to have suitable movement below said member or body portion of the mold is a slide or follower 2, equipped with upstanding pins $2^a$, adapted to enter apertures $2^b$ in said member, also apertures $2^c$ in the core member 3, presently fully disclosed, for forming transverse holes or passages in the post, said pins having shoulders $2^d$ thereon for supporting said core intact with relation to said body member. Said slide or follower is guided in vertical movement by suitable guides or pendants 4, depending from the body member 1, said slide or follower being connected by links or arms 5 to counterbalanced foot-levers 6, fulcrumed upon a common rod or shaft $6^a$, whose bearings or boxes $6^b$ are suitably bolted or secured to the trestle-like supports $1^a$. An arcuate or curved mold member 7, together with like supplemental or lateral members 8 8, completes the mold proper, which is thus caused to assume a circular outline in cross-section, said mold, however, also having arranged therein an auxiliary-bottom section 9, exteriorly conforming to the contacting surface of said mold and interiorly to the opposed surface of the proposed cement post. Said mold member 7 has suitable vent-openings therein to permit any surplus material to be forced therethrough, thus rendering said mold member effective for perfect compression, as in the post-molding operation. The lateral mold members or sections 8 are adapted to fit snugly upon the upper lateral edges of the auxiliary-bottom member 9, also upon shoulders $8^a$, formed by offset upstanding extensions $1^{aa}$ of the mold-body 1, and inward of the latter. The mold member 7 fits closely upon the upper edges of said lateral mold members 8 and inward of and snugly between upstanding extensions $8^b$ of the lateral mold members 8, thus providing for the accurate seating of said mold member 7 in effective or working position. Said extensions $8^b$ have upper end lateral flanges $8^{bb}$, adapted to extend beyond and overhang the intervals between the inner surfaces of the mold-body and the lateral mold sections or members to prevent the possibility of the falling of any foreign substances thereinbetween. Said lateral mold members 8 have connected thereto arms or pendants 10 for their manipulation or actuation, in turn having pivoted thereto one arm of each of two levers 11, preferably fulcrumed in hangers 12, pivotally suspended from lugs 12ª of the mold-body 1. The opposite arm of each lever 11 is pivoted or connected to a stirrup 13, suitably hung in position from the mold-body 1, said stirrups having connection with the counterbalanced foot-levers 6, also for actuating the follower 2, as previously described, thus providing common means for the simultaneous movement of said follower and said lateral mold members. Said mold member 7 is guided in its movement by means of and between upright bars or guides 14, suitably bolted or secured upon the mold-body 1, preferably as shown, and adapted to that end. Also, said mold member is suspended in position from counterbalanced centrally-pivoted quadrant-levers 15, the fulcrum axes or pivots 15ª thereof being suitably journaled each upon one of each of two pairs of uprights or standards 16, of which, however, there are three pairs, for a purpose presently seen. The suspending connection between each lever and said mold member consists of a line or rope 16ª with one end suitably knotted or secured in an eye 15$^b$, formed upon or at the upper end of one grooved quadrant 15$^x$ of the lever 15, said rope or line resting in the groove in said quadrant and having its other end suitably connected or looped, as at 16$^b$, into an eye-ended bolt 16$^c$, secured to said mold member. The points of connection between eye-ended bolts 16$^c$ and said mold member are near the ends of the latter, where the upraised strengthening-rib portion 7ª thereof is preferably tapered or sloped off, as shown. The counterbalance 15$^{bb}$ of each lever 15 is suspended, preferably, by an eye-ended rod 15$^c$, fixed to said counterbalance, and a rope or line 15$^{cc}$, looped into the eye of said rod, and an eye 15$^d$, integral with the upper end of a second grooved quadrant 15$^x$ at the opposite end of said lever, said rope or line resting in the groove of said quadrant. Said quadrant-levers are arranged obliquely with relation to the longitudinal plane of the mold-body to enable their counterbalances to move in lines laterally of the latter. This arrangement is effective to facilitate the manipulation or actuation of the mold member 7 in placing it in position and in removing it from the mold-body, as in conducting the molding operation, which will be readily appreciated. Stop-nuts 17 are applied to the mold member 7 to limit or control the movement thereof as required.

At the right-hand end of the machine is arranged what may be termed a "head-block" or "mold-section" 18, adapted to suitably slide a limited distance within the mold-body 1 and having an inner contour to form the rounded tapering outline of the upper end of the forming post. Said head-block or mold-section is centrally connected or linked, as at 18ª, to an actuating hand-lever 18$^b$, pivoted to a lug 18$^{bb}$ of the mold-body 1 and adapted to be engaged with a notched or shouldered catch 19, extending outward from said end of the mold-body for the retention of said lever in locked position for holding said head-block or mold-section in place during the molding operation. At the opposite or left-hand end of the machine is a collar 20, suitably adapted for insertion into that end of the mold and having its central opening receiving and supporting the corresponding end of the core member 3. Other openings are provided in the collar 20 to receive the anchoring or stay wires embedded in the forming post. Said collar is retained in position by a closure or door 21, itself being held in fixed position by latches 22, pivoted laterally to said mold-body and adapted to engage projections 21ª of said door. Said door also serves to support that end of the core member 3.

Toggle-levers 23, consisting of members 23ª, fixed at their upper ends to axial fulcrums or shafts 23$^{aa}$, supported or journaled upon the upper ends of the pairs of uprights or standards 16, and of additional members 23$^b$, are employed in connection with the mold member 7. The toggle members 23$^b$, having their lower ends connected to the upraised or rib portion 7ª of said mold member, preferably, as shown, by couplings 23$^{bb}$, are jointed or connected at their upper ends, together with the lower ends of the first-referred-to members 23ª, to pivots or axial studs 23$^c$, to which are also connected sections 24ª of a practically common coupling-rod 24, connecting together all of said toggle-levers for their simultaneous movement and for exerting the same pound-pressure by each toggle-lever upon the mold member 7. Said fulcrums or shafts 23$^{aa}$ have suitably extending therefrom integral counterbalancing-arms 23$^d$ to facilitate the manipulation or actuation of said toggle-levers, together with the other parts. Said rod-sections 24ª are screw-threaded and nutted together, as at 24$^b$, thus rendering them adjustable, the purpose of which will presently be disclosed. The function of said toggle-levers is primarily to provide for delivering the required pressure to the mold member 7, as in effecting the molding operation. By means of the adjustability of the coupling-rod sections 24ª the travel of the toggle-levers as they are raised with the mold member 7 is controlled or regulated. A hand-actuated lever 25 is suitably applied to one of the axial fulcrums or shafts of the toggle-levers for operating the machine, the movement imparted to one of said toggle-levers being transmitted to the others, as above intimated, through the coupling-rod 24. It is also noted that the post-hole-forming pins 2$^b$ of the follower 2 are suitably received by corresponding holes in the mold member 7 and that said pins may be wholly omitted in making or molding posts without transverse holes therethrough.

Fence-posts of any form or contour, size, or description, either hollow or solid, may be made by means of our machine without changing the general construction or mechanical design thereof. It is obvious that by dispensing with the use of the core or mandrel 3 and removing or detaching the hole-forming pins of the follower 2 the machine may be adapted for molding solid posts.

Initiating the machine for operation, the head-block 18 is moved into and secured in position by accordingly actuating the lever 18$^b$, finally dropping the latter into engagement with the catch 19. The auxiliary bottom 9 is next placed within the mold bed or body 1, it being shoved against said head-block. The lever 6 is now actuated, bringing the lateral mold members 8 down upon the upper edges of said auxiliary bottom. Simultaneously the follower 2 is forced into effective position, projecting its pins 2$^a$ through the holes in the mold body or bed and auxiliary bottom. The core 3 is inserted within said mold-body with the pins 2$^a$ of said follower, also passing through its holes, said core resting upon the shoulders 2$^d$ of said pins, thus supporting it centrally within and out of contact with the inner surface of said mold-body. The collar 20 is properly inserted in one end of the mold-body upon that end of the core 3, the door 21 then being closed and secured in position by suitably engaging its latches 22 with the projections 21$^a$ of said door. The material for molding purposes is now poured into the mold body or bed until the requisite quantity has been provided for the formation of the post. The lever 25 is suitably manipulated or actuated at this juncture, lowering the mold member 7 into position in the mold bed or body upon the lateral mold members 8, thus closing and completing the mold. Simultaneously the toggle-levers 23 are brought into requisition, and as they are thus "opened" they force the member 7 down upon the contents of the mold-body, imparting the requisite pressure for the effective compression of said contents into the post formation. Preliminarily to the removal of the post formation the lever 25 is reversely actuated, the lever 6 depressed, the end door 21 opened, the core or mandrel 3 withdrawn, and the head-block 18 swung outward, when said post formation and the auxiliary bottom or member 9, with the former resting therein, may be removed, said formation remaining in said bottom member until sufficiently "set" for its final removal or disposition.

Latitude is allowed as to details herein, since they may be changed as circumstances suggest without departing from the spirit of our invention.

We claim—

1. A machine of the character described, employing a mold-bed, a compression member coactive therewith, a core member arranged in said mold-bed; a hole-forming pin effective to sustain said core member within said mold-bed and means equipped with said pin.

2. A machine of the character described, employing a mold-bed, a compression member coactive therewith, a core member arranged within said mold-bed a follower bearing a hole-forming pin effective to sustain said core member centrally in position, and means for actuating said follower.

3. A machine of the character described, employing a mold-bed, a core member, a follower arranged below the latter and provided with hole-forming pins operative in connection with said mold-bed and effective to sustain said core member centrally and out of contact with said mold-bed, and means for actuating said follower.

4. A machine of the character described, employing a mold-bed, a compression member coactive therewith, and means for suspending said member in position comprising counterbalanced quadrant-levers, and connections between said levers and member.

5. A machine of the character described, employing a mold-bed, a compression member coactive therewith, means for suspending said compression member comprising counterbalanced quadrant-levers, and means for applying pressure to said member comprising toggle-lever mechanism connected up with said member.

6. A machine of the character described, employing a mold-bed, a compression member coactive therewith, means for suspending in position said member comprising counterbalanced quadrant-levers and connections between said member and said levers, and toggle-lever mechanism for applying pressure to said member.

7. A machine of the character described, employing a mold-bed, a compression member coactive therewith, quadrant-lever mechanism, a connection between said member and levers, and toggle-lever mechanism connected up with said member, and means for actuating said toggle-lever mechanism.

8. A machine of the character described, comprising a mold-bed, a compression or mold member coactive therewith, means for applying pressure to said mold member, lateral mold members coactive with both said mold-bed and compression member, a core for said mold-bed, and a follower equipped with a hole-forming pin effective to sustain said core member in position in said mold-bed and means for actuating said lateral mold members.

9. A machine of the character described, employing a mold-bed, a compression or mold member coactive with said mold-bed, and means for suspending in position said compression member, lever mechanism consisting of a centrally-pivoted lever provided with quadrants at its ends, connection being effected between one quadrant and said compression member, and a counterbalance suspended from the other of said quadrants.

10. A machine of the character described, employing a mold-bed, a core for said mold-bed, a follower equipped with hole-forming pins working in said mold-bed, and having shoulders thereon for supporting said core, or mandrel centrally within said mold-bed, and means for actuating said follower.

11. A machine of the character described, employing a mold bed or body, a core member arranged within the latter, a follower arranged in said mold-bed and equipped with pins effective to support said core member centrally within and out of contact with said mold-bed, counterbalanced foot-levers fulcrumed upon a pivot-rod, and links connected to said foot-levers and said follower.

12. A machine of the character described, employing a semicylindric mold bed or body, an arcuate compression or mold member, guides secured upon said body for said member and lateral mold members fitting upon said mold-bed and having lateral extensions overlying lateral upstanding extensions of said mold-bed, and means for imparting movement to said compression member.

13. A machine of the character described, employing a mold bed or body, and lateral mold members having outward-extending lateral flanges overhanging lateral upstanding extensions of said bed or body.

14. A machine of the character described, employing a mold bed or body, lateral mold members having outward-extended lateral flanges, and a compression or mold member having its outer lateral portions equipped with stop-nuts adapted to engage said lateral flanges to limit or control the movement of said compression member in one direction.

15. A machine of the character described, employing a mold bed or body, an auxiliary bottom member therefor, an end movable member coactive with said mold-bed and adapted to aid the production of the post formation, lateral mold members resting upon the upper lateral edges of said auxiliary bottom, and a compression member superposing said lateral mold members.

16. A machine of the character described, employing a mold bed or body, a core or mandrel member, means sustaining the latter centrally within the former, comprising a follower having upward-extending pins provided with shoulders upon which rests said core or mandrel, and a collar suitably held in one end of said mold-bed and slipped upon that end of said core or mandrel.

In testimony whereof we affix our signatures in presence of two subscribing witnesses.

BENNETT H. McMILLAN.
WILLIAM C. JOHNSON.
FRANK M. COLLORD.

Witnesses:
　LOUIS PLATT,
　PERCY L. PLATT.